(12) United States Patent
Oshima

(10) Patent No.: US 12,254,226 B2
(45) Date of Patent: Mar. 18, 2025

(54) IMAGE PROCESSING SYSTEM, IMAGE FORMING APPARATUS, AND COMPUTER READABLE MEDIUM FOR EXECUTION OF A JOB IN A SHARED SPACE

(71) Applicant: FUJIFILM BUSINESS INNOVATION CORP., Tokyo (JP)

(72) Inventor: Akihide Oshima, Yokohama (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 680 days.

(21) Appl. No.: 17/387,735

(22) Filed: Jul. 28, 2021

(65) Prior Publication Data

US 2022/0300221 A1 Sep. 22, 2022

(30) Foreign Application Priority Data

Mar. 22, 2021 (JP) ................................ 2021-047240

(51) Int. Cl.
*G06F 3/12* (2006.01)
(52) U.S. Cl.
CPC .......... *G06F 3/1222* (2013.01); *G06F 3/1236* (2013.01); *G06F 3/1238* (2013.01); *G06F 3/1267* (2013.01); *G06F 3/1288* (2013.01)
(58) Field of Classification Search
CPC .... G06F 3/1222; G06F 3/1236; G06F 3/1238; G06F 3/1288; G06F 3/1267; H04N 1/0023
See application file for complete search history.

(56) References Cited

U.S. PATENT DOCUMENTS

2016/0112583 A1 4/2016 Oguma

FOREIGN PATENT DOCUMENTS

JP 6047480 B2 12/2016
JP 2020-154802 A 9/2020

OTHER PUBLICATIONS

Mar. 1, 2022 Search Report issued in European Patent Application No. 21195245.2.

(Continued)

*Primary Examiner* — Nicholas Pachol
(74) *Attorney, Agent, or Firm* — Oliff PLC

(57) ABSTRACT

An image processing system includes: a first processor that is mounted on a first image processing apparatus, the first image processing apparatus being placed in a shared space, and configured to be used by plural users that do not belong to a same organization; a second processor that is mounted on a connection server, the connection server being placed outside the shared space, connected to a local area network of an organization to which at least one of the plural users belongs, and configured to connect a virtual private line; a third processor that is mounted on a second image processing apparatus, the second image processing apparatus being connected to the local area network of the organization; and a fourth processor that is mounted on a management server, the management server being placed outside the shared space and the local area network of the organization, and configured to manage connection server connection information used to establish the virtual private line with the connection server of the organization and access information used to access the second image processing apparatus of the organization, in which the third processor is configured to store, in the second image processing apparatus, a job relating to image processing generated by a user belonging to the organization, the fourth processor is configured to, in response to a connection information acquisition request in which organization identification information is designated being transmitted from the first image processing apparatus, return connection server connection information corresponding to an organization designated in the connection information acquisition request, and the first processor is (Continued)

configured to establish, via the virtual private line, connection with a connection server of an organization using the connection server connection information corresponding to the organization and acquired by transmitting, to the management server, the connection information acquisition request including the organization identification information designated by a user of the first image processing apparatus, acquire, in response to a job acquisition instruction including the organization identification information designated by the user of the first image processing apparatus, a job from the second image processing apparatus of the organization that is accessible using access information of the organization via the virtual private line, and execute the acquired job with the first image processing apparatus.

11 Claims, 8 Drawing Sheets

(56) References Cited

OTHER PUBLICATIONS

Dec. 3, 2024 Office Action issued in Japanese Patent Application No. 2021-047240.

FIG. 2

MANAGEMENT SERVER INFORMATION

| COMPANY AUTHENTICATION INFORMATION ||  URL |
|---|---|---|
| COMPANY ID | PASSWORD | |
| a | passa | https::www.a.kanri.com |
| b | passb | https::www.b.kanri.com |
| ... | | |

FIG. 3

COMPANY INFORMATION

| COMPANY AUTHENTICATION INFORMATION | VPN SERVER CONNECTION INFORMATION | AUTHENTICATION SERVER CONNECTION INFORMATION | PARENT DEVICE CONNECTION INFORMATION |
|---|---|---|---|
| · COMPANY ID<br>· PASSWORD | · SERVER ADDRESS<br>· PORT NUMBER<br>· AUTHENTICATION INFORMATION (ID, PASSWORD, CERTIFICATE, VPN SETTING OR THE LIKE) | · SERVER ADDRESS<br>· PORT NUMBER<br>· AUTHENTICATION INFORMATION (ID, PASSWORD, CERTIFICATE OR THE LIKE) | · IP ADDRESS<br>· PORT NUMBER<br>· AUTHENTICATION INFORMATION (ID, PASSWORD, CERTIFICATE OR THE LIKE) |

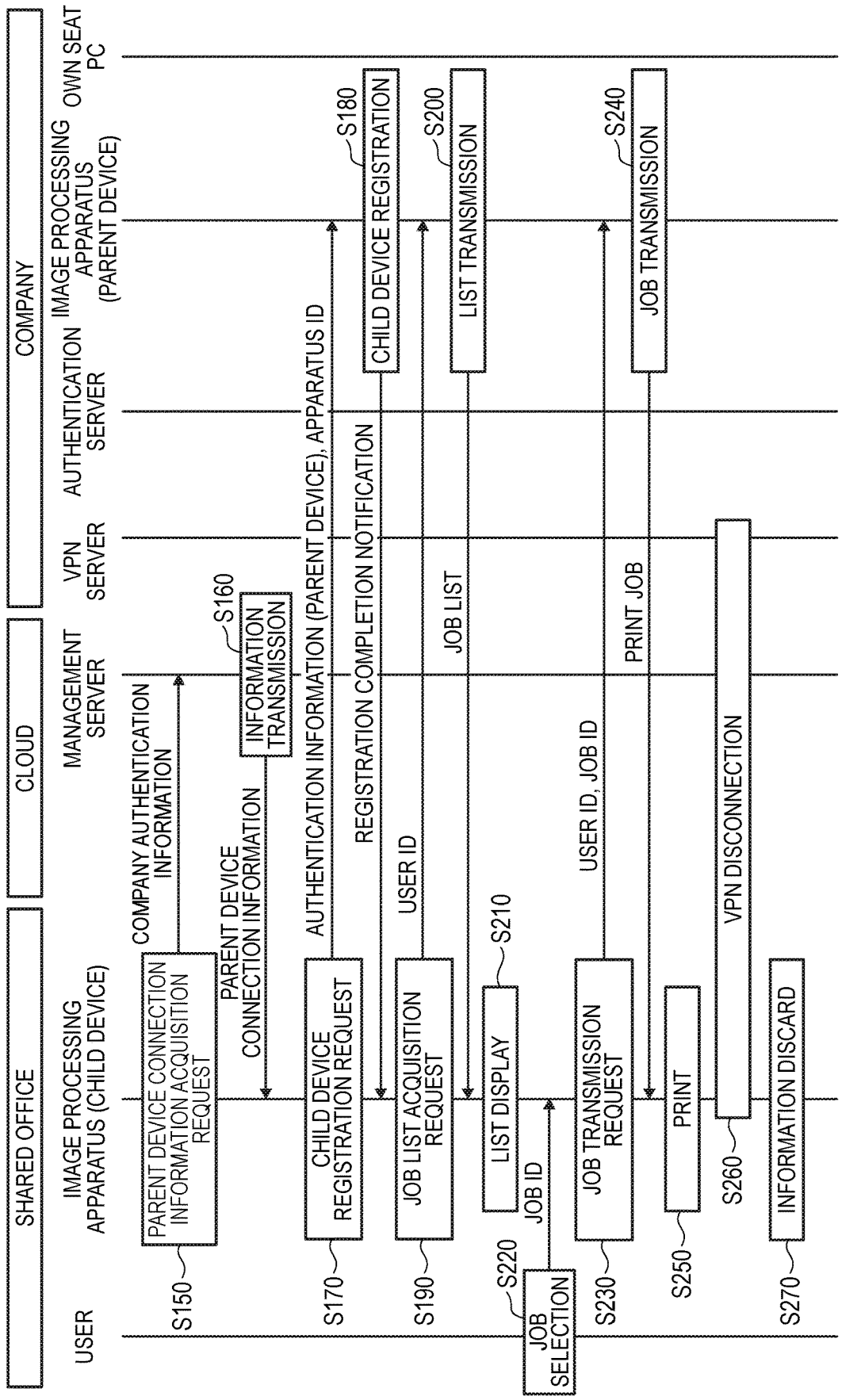

FIG. 6

| COMPANY INFORMATION | | | | |
|---|---|---|---|---|
| COMPANY AUTHENTICATION INFORMATION | VPN SERVER CONNECTION INFORMATION | AUTHENTICATION SERVER CONNECTION INFORMATION | PARENT DEVICE CONNECTION INFORMATION | CONNECTED CHILD DEVICE INFORMATION |
| • COMPANY ID<br>• PASSWORD | • SERVER ADDRESS<br>• PORT NUMBER<br>• AUTHENTICATION INFORMATION (ID, PASSWORD, CERTIFICATE, VPN SETTING OR THE LIKE) | • SERVER ADDRESS<br>• PORT NUMBER<br>• AUTHENTICATION INFORMATION (ID, PASSWORD, CERTIFICATE OR THE LIKE) | • IP ADDRESS<br>• PORT NUMBER<br>• AUTHENTICATION INFORMATION (ID, PASSWORD, CERTIFICATE OR THE LIKE) | • IP ADDRESS |

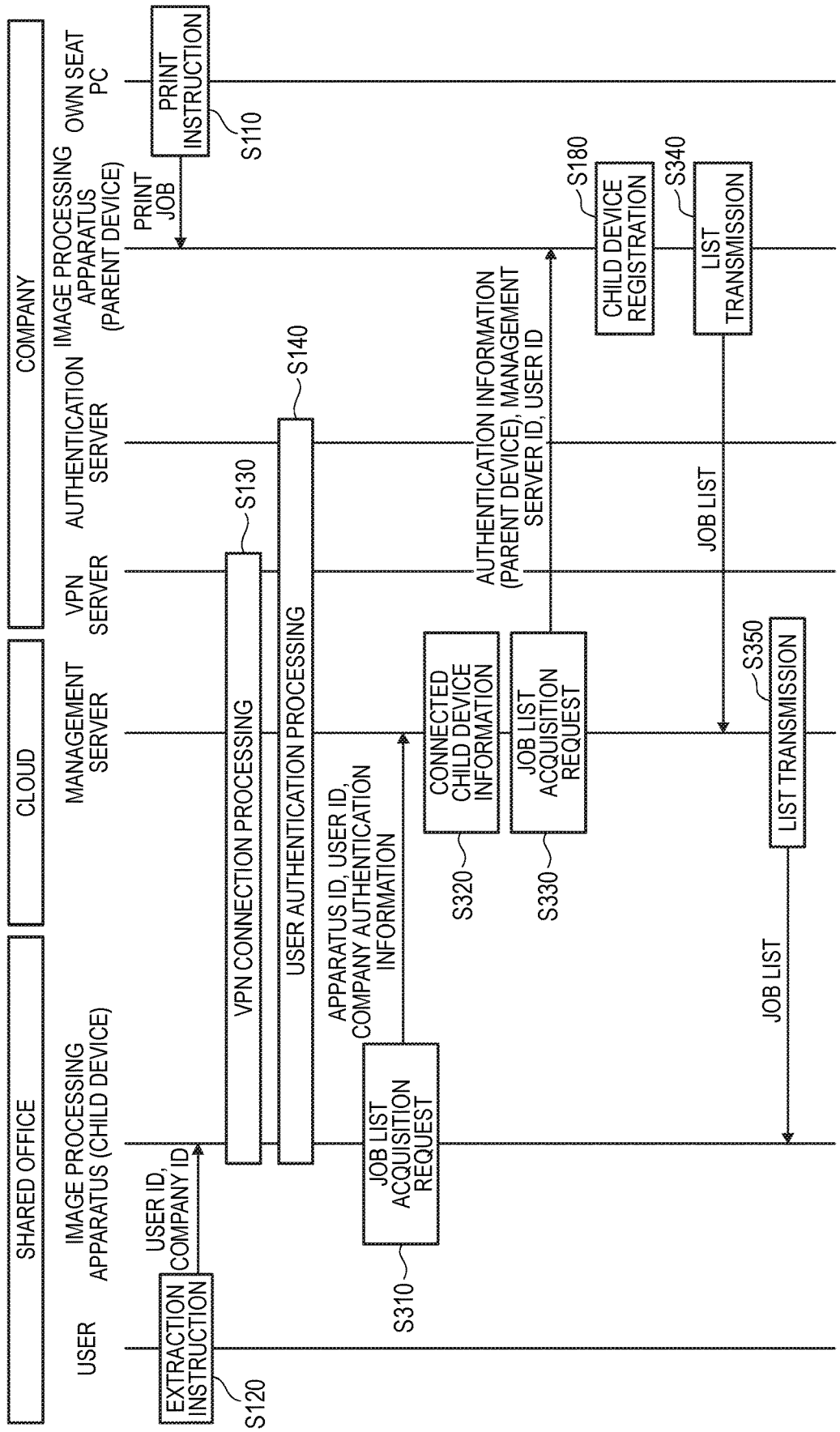

IMAGE PROCESSING SYSTEM, IMAGE FORMING APPARATUS, AND COMPUTER READABLE MEDIUM FOR EXECUTION OF A JOB IN A SHARED SPACE

CROSS-REFERENCE TO RELATED APPLICATIONS

This application is based on and claims priority under 35 USC 119 from Japanese Patent Application No. 2021-047240 filed on Mar. 22, 2021.

BACKGROUND

Technical Field

The present invention relates to an image processing system, an image forming apparatus, and a computer readable medium storing a program.

Related Art

When a computer provided in a head office, for example, is connected to, via a network, a computer placed in another site such as a branch office or a mobile terminal taken out of the office, from the viewpoint of security, it is desirable to establish a virtual private line, that is, a so-called VPN (Virtual Private Network), and to transmit and receive information via the VPN. In order to establish the VPN, each computer to be connected to the VPN stores information necessary for establishing the VPN and is connected to the VPN by referring to the information when being connected to the VPN (please see Japanese Patent No. 6047480, for example).

Meanwhile, in recent years, along with reformation of work methods and spread of remote works, workplaces used by workers in across companies, freelances, students, or the like such as co-working spaces and shared offices have been expanded. An administrator of a workplace places a multi-function device or the like equipped with a print function or a FAX function in the workplace to provide a service to a user of the workplace.

For a PC that is brought to the workplace by a user of the workplace and used by the user, in consideration of prevention of information leakage due to theft or the like, information related to a company and data to be printed is not stored in the PC. Then, when the multifunction device placed in the workplace is to execute a job, a job in an in-company system is transmitted to the multifunction device and executed. In this case, from the viewpoint of security, it is desirable to connect the multifunction device placed in the workplace to an in-company VPN server via the VPN.

SUMMARY

An information processing apparatus placed in a shared space is shared by multiple users who do not belong to the same organization. For example, in order to connect, by a virtual private line, the information processing apparatus to a server placed in an organization to which a user belongs, it is necessary for the information processing apparatus to use information necessary for establishing the virtual private line with the server. However, the information necessary for establishing the virtual private line with the server placed in the organization is information related to the organization and can be said to be confidential information. Further, the job to be executed by the information processing apparatus may also be confidential information, similarly to the information related to the organization.

Nevertheless, if the information related to the organization and the job is stored in the information processing apparatus shared with a user belonging to another organization, a security problem may occur.

Aspects of non-limiting embodiments of the present disclosure relate to causing an image processing apparatus that is placed in a shared space and shared by multiple users who do not belong to the same organization, to execute a job accompanied by image processing stored on an organization side without storing information related to the organization and the job.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image processing system including: a first processor that is mounted on a first image processing apparatus, the first image processing apparatus being placed in a shared space, and configured to be used by plural users that do not belong to a same organization; a second processor that is mounted on a connection server, the connection server being placed outside the shared space, connected to a local area network of an organization to which at least one of the plural users belongs, and configured to connect a virtual private line; a third processor that is mounted on a second image processing apparatus, the second image processing apparatus being connected to the local area network of the organization; and a fourth processor that is mounted on a management server, the management server being placed outside the shared space and the local area network of the organization, and configured to manage connection server connection information used to establish the virtual private line with the connection server of the organization and access information used to access the second image processing apparatus of the organization, in which the third processor is configured to store, in the second image processing apparatus, a job relating to image processing generated by a user belonging to the organization, the fourth processor is configured to, in response to a connection information acquisition request in which organization identification information is designated being transmitted from the first image processing apparatus, return connection server connection information corresponding to an organization designated in the connection information acquisition request, and the first processor is configured to establish, via the virtual private line, connection with a connection server of an organization using the connection server connection information corresponding to the organization and acquired by transmitting, to the management server, the connection information acquisition request including the organization identification information designated by a user of the first image processing apparatus, acquire, in response to a job acquisition instruction including the organization identification information designated by the user of the first image processing apparatus, a job from the second image processing apparatus of the organization that is accessible using access information of the organization via the virtual private line, and execute the acquired job with the first image processing apparatus.

BRIEF DESCRIPTION OF THE DRAWINGS

Exemplary embodiment(s) of the present invention will be described in detail based on the following figures, wherein:

FIG. 2 is a diagram illustrating an example of a data configuration of management server information stored in a management server information storage unit according to the first exemplary embodiment;

FIG. 3 is a diagram illustrating an example of a data configuration of company information stored in a company information storage unit according to the first exemplary embodiment;

FIG. 4B is a sequence diagram following FIG. 4A;

FIG. 6 is a diagram illustrating an example of a data configuration of company information stored in a company information storage unit according to the second exemplary embodiment;

FIG. 7A is a sequence diagram illustrating a process of the image processing apparatus executing a print job according to the second exemplary embodiment.

DETAILED DESCRIPTION

Hereinafter, exemplary embodiments of the present invention will be described with reference to the drawings.

First Exemplary Embodiment

Figure 1:
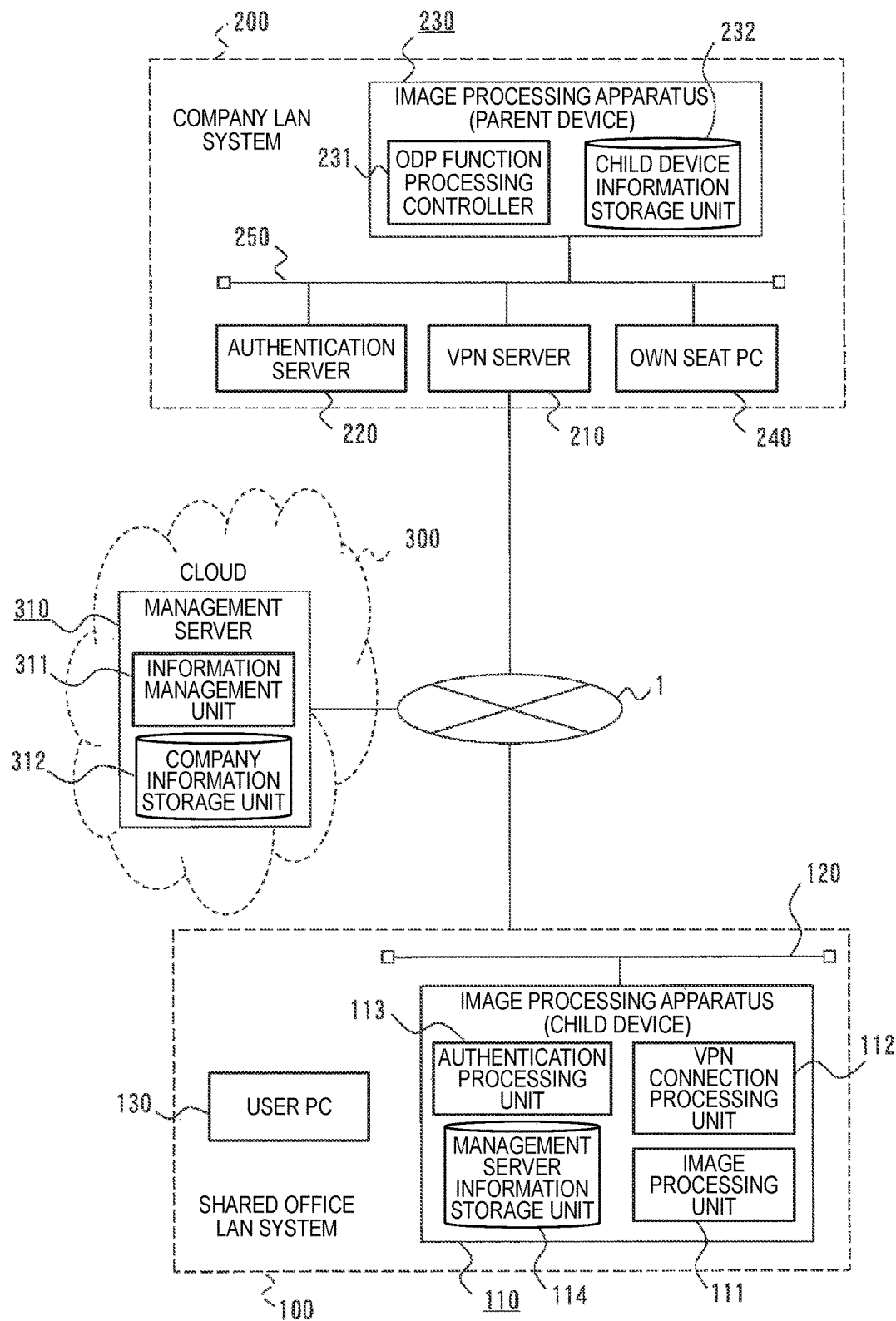
FIG. 1 is a block configuration diagram illustrating an information processing system according to a first exemplary embodiment.

FIG. 1 is a block configuration diagram illustrating an information processing system according to the first exemplary embodiment of the present invention. FIG. 1 illustrates a configuration in which a shared office LAN (Local Area Network) system 100, a company LAN system 200, and a management server 310 placed in a cloud 300 are connected via a network 1 implemented by the Internet or the like. The information processing system according to the present exemplary embodiment may be implemented by combining existing computers as hardware, and as to be described later, controls characteristic information processing according to the present exemplary embodiment by software operating on each computer.

The information processing system may include shared office LAN systems 100 of multiple shared offices and company LAN systems 200 of multiple companies, but since each information processing system may have a configuration to be described later, one LAN system 100 and one LAN system 200 are shown in FIG. 1. Only one management server 310 is provided in the information processing system. Although the management server 310 is provided in the cloud 300 in the present exemplary embodiment, the management server 310 is not limited to being provided in the cloud 300 as long as the management server 310 may be accessed from each of the LAN systems 100 and 200.

The shared office LAN system 100 is a LAN system placed in a shared office. In the present exemplary embodiment, a "shared space" is a space in which multiple users who do not belong to the same organization are mixed. In the present exemplary embodiment, the shared office will be described as an example of the shared space.

The "organization" means a group configured to achieve a specific object. If a user who does not belong to any of the organizations uses the shared office, the shared office may be a space shared by multiple users who do not belong to the same organization rather than multiple users who belong to different organizations. In the present exemplary embodiment, for convenience of description, it is assumed that the user of the shared office belongs to any of the organizations. When there is a user who does not belong to any of the organizations, it is treated as if there is an organization to which the only one individual user belongs. In the present exemplary embodiment, a company will be described as an example of the organization. Therefore, in the following description, the "organization" and the "company" are used in the same meaning. Examples of other organizations include educational institutions such as university.

The company LAN system 200 is a LAN system placed in a company, and is constructed outside the shared office. Since the shared office LAN system 100 is used by users belonging to multiple companies, the company LAN system 200 exists for each company to which each user belongs, and is connected to the network 1.

An image processing apparatus 110 is placed in the shared office and is used only by users in the shared office. More specifically, the image processing apparatus 110 may be used by a user belonging to an organization contracted with an administrator of the shared office. The image processing apparatus 110 is shared by users who belong to multiple organizations, in other words, multiple users who do not belong to the same organization. The image processing apparatus 110 according to the present exemplary embodiment is used as a setting-based child device in an on-demand print service. The image processing apparatus 110 is also referred to as an image forming apparatus, is a multifunction device equipped with various functions accompanied by image processing such as a print function, a copy function, and a scanner function, and functions as a first image processing apparatus with a built-in computer. The image processing apparatus 110 includes a CPU serving as a first processor, a ROM, a RAM, an HDD, a scanner serving as an image reading device that reads an image on a medium such as paper, a print engine serving as an image forming device that forms an image on a medium, an operation panel that receives an instruction from a user and displays information, and a network interface that connects communication lines such as the network 1 and a LAN 120. The image processing apparatus 110 according to the present exemplary embodiment includes a card reader. Further, the image processing apparatus 110 may include an external media interface to which an external memory device such as a USB memory or a flash memory is connected, and a wireless communication unit for performing short-range wireless communication with a user PC 130.

The image processing apparatus 110 includes an image processing unit 111, a VPN connection processing unit 112, an authentication processing unit 113, and a management server information storage unit 114. The image processing unit 111 performs image processing in response to a request from the user. When providing the on-demand print service, the image processing apparatus 110 according to the present exemplary embodiment operates as a registration-based child device, and executes, as image processing, a print job accompanied by image processing. The image processing unit 111 provides various image processing functions according to hardware and software provided in the image processing apparatus 110. However, each user who is permitted to use the shared office may not necessarily use all the functions provided by the image processing apparatus 110, and may use functions within a range defined in contract information related to use of the shared office.

In response to a request from the user, the VPN connection processing unit 112 establishes VPN connection with a VPN server 210 of a company LAN system 200 of a company to which the user belongs. In the present exemplary embodiment, connection between two parties, for example, connection between the shared office LAN system 100 and the company LAN system 200 via a VPN in a communicable manner is referred to as "VPN connection". Further, the VPN connection processing unit 112 disconnects the VPN connection in response to a release request. The authentication processing unit 113 authenticates whether a user of the image processing apparatus 110 is a user belonging to a destination company with which the VPN connection is established.

FIG. 2 is a diagram illustrating an example of a data configuration of management server information stored in the management server information storage unit 114 according to the present exemplary embodiment. The management server information is information necessary for accessing the management server 310. In the management server information, company authentication information and a URL (Uniform Resource Locator) are set in combination for each company to which each user in the shared office belongs. The company authentication information is authentication information necessary for acquiring information of the company, and includes identification information (hereinafter referred to as "company ID") of the company and a password. The URL is storage destination information for specifying a location where the information related to the company is stored. An administrator or the like of a company or a shared office sets the management server information in advance in the management server information storage unit 114 according to a contract between the company and the shared office.

Each of the components 111 to 113 in the image processing apparatus 110 is implemented by a cooperative operation between a computer mounted on the image processing apparatus 110 and a program operating on a CPU mounted on the computer as the first processor. The management server information storage unit 114 is implemented by an HDD mounted on the image processing apparatus 110. Alternatively, a RAM or another computer located in the shared office LAN system 100 may be used via the LAN 120.

Further, the user PC 130 is a portable PC brought into the shared office by an employee or the like of each company. The user may bring an own seat PC 240 into the shared office and use the own seat PC 240 as the user PC 130. The company LAN system 200 is constructed outside the shared office LAN system 100. The company LAN system 200 is configured by connecting the VPN server 210, an authentication server 220, an image processing apparatus 230, and the own seat PC 240 via a LAN 250.

The VPN server 210 has a function for connecting the VPN in response to a VPN connection request from an external apparatus, which is called a VPN server function or a VPN router function, and establishes the VPN connection in response to a request from an external network system, the image processing apparatus 110 of the shared office LAN system 100 in the present exemplary embodiment. The VPN server 210 in the present exemplary embodiment relays data exchanged between the image processing apparatus 110 connected to the VPN and a computer such as the authentication server 220 connected to the LAN 250 of the company LAN system 200.

In the VPN server 210, information related to the image processing apparatus 110 serving as the VPN connection target, specifically, identification information and authentication information of the image processing apparatus 110 may be set in advance. The image processing apparatus 110 serving as the setting target may be specified by making a contract with the shared office, and may acquire necessary information. Instead of the identification information of the image processing apparatus 110, a user ID of a user belonging to a company or permission information (for example, a certificate or a password) issued to the image processing apparatus 110 by the VPN server 210 may be used.

The VPN server 210 realizes a processing function to be described later by a cooperative operation between a computer implementing the VPN server 210 and a program operating on a CPU mounted on the computer as a second processor. In response to a request from the image processing apparatus 110, the authentication server 220 performs user authentication on a user of an own company who is in the shared office. The authentication server 220 realizes processing functions to be described later by a cooperative operation between a computer implementing the authentication server 220 and a program operating on a CPU mounted on the computer as a fifth processor. The image processing apparatus 230 is also referred to as an image forming apparatus, is a multifunction device equipped with various functions accompanied by image processing such as a print function, a copy function, and a scanner function, and functions as a second image processing apparatus with a built-in computer. The image processing apparatus 230 includes a CPU serving as a third processor, a ROM, a RAM, an HDD, a scanner serving as an image reading device that reads an image on a medium such as paper, a print engine serving as an image forming device that forms an image on a medium, an operation panel that receives an instruction from a user and displays information, and a network interface that connects communication lines such as the network 1 and the LAN 250. Further, the image processing apparatus 230 according to the present exemplary embodiment may include an external media interface to which an external memory device such as a USB memory or a flash memory is connected.

The image processing apparatus 230 according to the present exemplary embodiment is used as a setting-based parent device in the on-demand print service. The on-demand print service is a function of forming a group by multiple image processing apparatuses and enabling any of the image processing apparatuses forming the group to print print data stored in the image processing apparatuses forming the group. Here, the group of the image processing apparatuses that provide the on-demand print service will be described in a form in which one image processing apparatus is set as a parent device and the remaining image processing apparatuses are set as child devices, but the image processing apparatuses forming the group may have the same function and forming the group without distinguishing the parent device from the child device.

The image processing apparatus 230 includes an ODP (On-Demand Print) function processing controller 231 and a child device information storage unit 232. Components not used in the description of the present exemplary embodiment are omitted from the drawings. The ODP function processing controller 231 causes the image processing apparatus 230 to perform the on-demand print function. That is, the ODP function processing controller 231 is linked with a device registered as a child device, for example, the image processing apparatus 110 to provide the on-demand print service. Child device information related to a child device of the image processing apparatus 230 operating as the parent device in the on-demand print service is registered in the child device information storage unit 232. Address information (for example, an IP address) of a device operating as a child device is set in the child device information. The ODP function processing controller 231 is implemented by a cooperative operation between a computer mounted on the image processing apparatus 230 and a program operating on a CPU mounted on the computer as the third processor. Further, the child device information storage unit 232 is implemented by an HDD mounted on the image processing apparatus 230. Alternatively, a RAM or another computer provided in the company LAN system 200 may be used via the LAN 250. Multiple PCs used by staffs or the like are connected to the LAN 250, but the own seat PC 240 is an information processing apparatus used in the company by employees or the like who use the shared office. The own seat PC 240 stores data to be printed created by the user. The processing to be performed in the own seat PC 240 is realized by a cooperative operation of a computer implementing the own seat PC 240 and a program operating on a CPU mounted on the computer as a sixth processor.

Each of the VPN server 210, the authentication server 220, the image processing apparatus 230, and the own seat PC 240 may be implemented by an existing general-purpose computer, and includes a CPU, a storage unit such as a ROM, a RAM, and an HDD, a user interface, and a network interface that connects communication lines such as the network 1 and the LAN 250.

The management server 310 is placed outside the LAN systems 100 and 200. As described above, the management server 310 is placed in the cloud 300 so as to be accessible from the image processing apparatus 110 and the VPN server 210.

The management server 310 includes an information management unit 311 and a company information storage unit 312. The information management unit 311 manages company information, and sets and provides company information in response to an external request.

FIG. 3 is a diagram illustrating an example of a data configuration of the company information stored in the company information storage unit 312 according to the present exemplary embodiment. The company information is set in advance for each company to which the user of the shared office belongs. The company information includes information necessary when the image processing apparatus 110 starts to access the VPN server 210 and the authentication server 220 of each company. The company information includes company authentication information, VPN server connection information, authentication server connection information, and parent device connection information. The company authentication information is authentication information necessary for accessing information of the company, and the same contents as the company authentication information stored in the image processing apparatus 110 are set.

The VPN server connection information includes information necessary for the image processing apparatus 110 to establish VPN connection with the VPN server 210 of the company. In the VPN server connection information, a server address is set as address information for specifying the VPN server 210 serving as an access destination. Basically, an IP address is set. A port number is a port number for establishing connection with the VPN server 210. Authentication information is information necessary for the image processing apparatus 110 to be authenticated by the VPN server 210 which is the connection destination, and includes an ID, a password, a certificate issued by the VPN server 210, and a VPN setting including setting contents related to communication via the VPN such as an encryption method and a protocol.

The authentication server connection information includes information necessary for the image processing apparatus 110 to access the authentication server 220 of the company. In the authentication server connection information, a server address is set as address information for specifying the authentication server 220 serving as an access destination. Basically, an IP address is set. A port number is a port number for establishing connection with the authentication server 220. Authentication information is information necessary for the image processing apparatus 110 to be authenticated by the authentication server 220 which is a connection destination, and includes an ID, a password, a certificate, or the like. The parent device connection information includes information necessary for the image processing apparatus 110 to access the image processing apparatus 230 of the company operating as the parent device when providing the on-demand print service. In the parent device connection information, an IP address is basically set as address information for specifying the image processing apparatus 230 serving as an access destination. A port number is a port number for establishing connection with the image processing apparatus 230. Authentication information is information necessary for the image processing apparatus 110 to be authenticated by the image processing apparatus 230 which is a connection destination, and includes an ID, a password, a certificate, and the like.

The information management unit 311 in the management server 310 is implemented by a cooperative operation between a computer implementing the management server 310 and a program operating on a CPU mounted on the computer as a fourth processor. The company information storage unit 312 is implemented by an HDD placed in the management server 310. Alternatively, a RAM or a storage unit in anther computer provided in the cloud 300 may be used.

Further, the program used in the present exemplary embodiment may be provided not only by a communication unit but also by being stored in a computer-readable recording medium such as a CD-ROM or a USB memory. Programs provided from a communication unit or a recording medium are placed in a computer, and a CPU of the computer sequentially executes the programs to realize various processes.

Next, operations in the present exemplary embodiment will be described. In the present exemplary embodiment, a case will be described as an example in which a user who normally performs printing using the image processing apparatus 230 in a company uses the on-demand print service to perform printing in the image processing apparatus 110 when using the shared office.

When the company considers to use the user PC 130 in the shared office, a data file to be used by the image processing apparatus 110 may not be stored in the user PC 130 for the purpose of preventing information leakage. In this case, the user PC 130 cannot directly send data to the image processing apparatus 110 and cause the image processing apparatus 110 to execute printing. Therefore, the user transmits a print job to the image processing apparatus 230 from the own seat PC 240 or the like in which data desired to be printed is actually stored, and instructs the image processing apparatus 230 to perform printing. However, at this point, the image processing apparatus 230 only registers the print job instead of executing the print job. That is, the image processing apparatus 230 temporarily stores the print job.

Then, when the user goes to the shared office, the user moves the print job stored in the image processing apparatus 230 to the image processing apparatus 110 and causes the image processing apparatus 110 to perform printing. In this case, from the viewpoint of security, the image processing apparatus 110 and the in-company VPN server 210 are connected to each other via the VPN, and then the data to be printed is transmitted.

However, if the information necessary for the VPN connection, that is, information unique to the company is stored and managed in the shared office LAN system 100 including the image processing apparatus 110, information leakage may occur.

Therefore, in the present exemplary embodiment, the information unique to the company, that is, the company information illustrated in FIG. 3 is stored in the management server 310 on the cloud 300 instead of the image processing apparatus 110, and the image processing apparatus 110 is configured to acquire the information when necessary. Further, the print job itself is not stored into the image processing apparatus 110 on a shared office side before printing is performed.

Figure 4A:
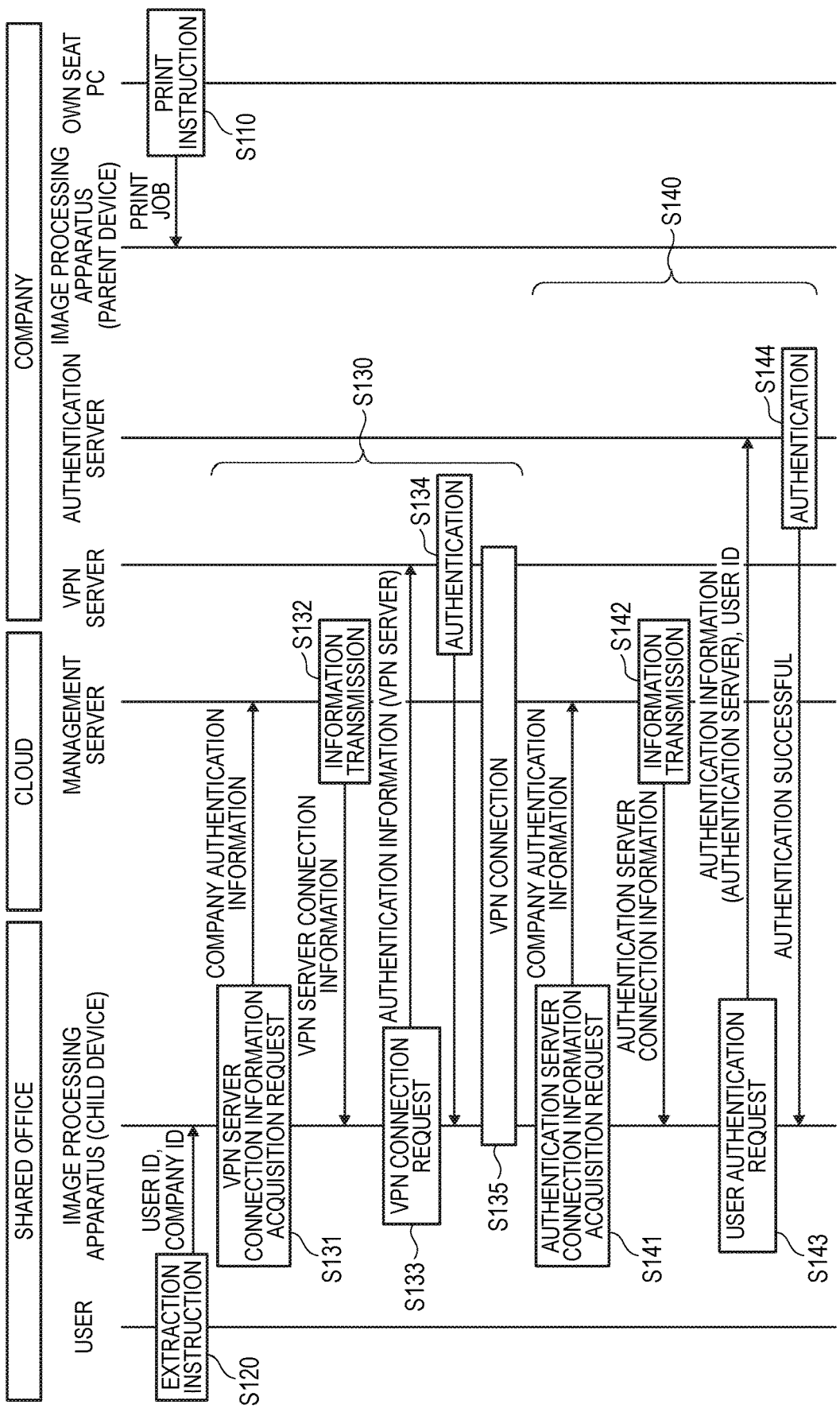
FIG. 4A is a sequence diagram illustrating a process of the image processing apparatus executing a print job according to the first exemplary embodiment.

Hereinafter, a process in which the user of the shared office performs printing by causing the image processing apparatus 110 to execute the print job created in the company will be described with reference to sequence diagrams illustrated in FIGS. 4A and 4B. As described above, it is necessary to set the management server information illustrated in FIG. 2 based on the contract between the company and the shared office before the present process is performed. Among the company information shown in FIG. 3, the company authentication information, the VPN server connection information, and the authentication server connection information is set by an administrator of the company registering the above information from the VPN server 210 or an administrator PC (not shown) into the company information storage unit 312 of the management server 310. Alternatively, the information may be transmitted to the administrator of the management server 310 and registered. Further, there are two methods for setting the parent device connection information. One method is to manually set the parent device connection information in the same manner as the VPN server connection information or the like. The other method is to set the parent device connection information by the management server 310 operating autonomously. Specifically, the setting is performed as follows.

That is, the management server 310 is VPN-connected to the VPN server 210 with reference to the VPN server connection information set in the company information.

Accordingly, the management server 310 is virtually connected to the LAN 250, so that the management server 310 detects the image processing apparatus 230, which may be set as the parent device, by searching for the device connected to the LAN 250. Then, the management server 310 acquires information necessary for establishing connection to the image processing apparatus 230, and registers the acquired information as parent device connection information into the company information in the company information storage unit 312.

As described above, in a state where necessary information is set, the user instructs the image processing apparatus 230 to perform printing from the own seat PC 240 when the user is in the company (step 110). At this time, the print job to be executed in the image processing apparatus 110 is sent to the image processing apparatus 230, but is only stored and is not executed.

The user who goes to the shared office issues a print job extraction instruction to the image processing apparatus 110 (step 120). For example, the user holds a carrying IC card over the card reader (not shown) of the image processing apparatus 110. The IC card is provided from the shared office or the company, and identification information (hereinafter, "user ID") of a user who carries the IC card and a company ID are recorded in the IC card.

When the image processing apparatus 110 acquires the user ID and the company ID from the IC card, the image processing apparatus 110 executes the VPN connection processing as follows (step 130). More specifically, the VPN connection processing unit 112 acquires the management server information corresponding to the company by searching for the management server information based on the acquired company ID. Then, the VPN connection processing unit 112 designates a URL included in the acquired management server information, and transmits an acquisition request of the VPN server connection information including the company authentication information to the management server 310 (step 131).

When the information management unit 311 in the management server 310 receives the request from the image processing apparatus 110, the information management unit 311 authenticates the company based on the company authentication information included in the request, and then returns the VPN server connection information of the company (step 132).

When the VPN server connection information is acquired from the management server 310, the VPN connection processing unit 112 transmits a VPN connection request including authentication information to the server address and the port number included in the VPN server connection information (step 133).

When the VPN server 210 receives the VPN connection request from the image processing apparatus 110, the VPN server 210 authenticates the image processing apparatus 110 based on the authentication information included in the request, and then returns connection permission (step 134).

As described above, the VPN connection processing unit 112 establishes VPN connection between the image processing apparatus 110 and the VPN server 210 owned by the company to which the user carrying the IC card belongs (step 135). When the VPN connection is established, the image processing apparatus 110 subsequently executes user authentication processing (step 140). More specifically, the authentication processing unit 113 designates the URL included in the management server information acquired in step 131, and transmits an authentication server connection information acquisition request including the company authentication information to the management server 310 (step 141). When the information management unit 311 in the management server 310 receives the request from the image processing apparatus 110, the information management unit 311 authenticates the company based on the company authentication information included in the request, and then returns the authentication server connection information of the company (step 142).

When the authentication server connection information is acquired from the management server 310, the authentication processing unit 113 requests authentication of the user by transmitting, via the VPN, a user authentication request including the authentication information and the user ID acquired from the IC card to the server address and the port number included in the authentication server connection information (step 143).

When the authentication server 220 receives the user authentication request from the image processing apparatus 110, the authentication server 220 authenticates the image processing apparatus 110 based on the authentication information included in the request, and then performs user authentication based on the user ID included in the user authentication request (step 144). Here, the description will be continued on the assumption that the user authentication is successful.

Subsequently, the image processing unit 111 in the image processing apparatus 110 designates the URL included in the management server information acquired in step 131, and transmits a parent device connection information acquisition request including the company authentication information to the management server 310 (step 150).

When the information management unit 311 in the management server 310 receives the acquisition request from the image processing apparatus 110, the information management unit 311 authenticates the company based on the company authentication information included in the request, and then returns the parent device connection information of the company (step S160).

When the parent device connection information is acquired from the management server 310, the image processing unit 111 transmits, via the VPN, a child device registration request including the authentication information of the image processing apparatus 230 serving as the parent device and identification information of the own apparatus (hereinafter, "apparatus ID", for example, an IP address) to the server address and the port number included in the parent device connection information to request to register the own apparatus as the child device (step 170).

When the child device registration request is transmitted, the ODP function processing controller 231 in the image processing apparatus 230 authenticates the image processing apparatus 110 based on the authentication information included in the request, and then registers the image processing apparatus 110 corresponding to the apparatus ID included in the child device registration request into the child device information storage unit 232 as a child device. Then, the ODP function processing controller 231 returns, via the VPN, a registration completion notification to the image processing apparatus 110 serving as a request transmission source (step 180).

As described above, when the image processing apparatus 110 is registered as a child device of the image processing apparatus 230, the image processing unit 111 transmits, to the image processing apparatus 230, a job list acquisition request including the user ID of the user, who issues the print job extraction instruction in step 120, via the VPN (step 190).

In response to the job list acquisition request transmitted from the image processing apparatus 110, the image processing apparatus 230 reads identification information for a print job of a user corresponding to the user ID included in the job list acquisition request among the stored print jobs, for example, a job ID, a job name, and the like (hereinafter, collectively referred to as "job ID"), and creates a job list. Then, the image processing apparatus 230 returns, via the VPN, the created job list to the image processing apparatus 110 serving as the request transmission source (step 200).

Subsequently, the image processing unit 111 displays the returned job list on the operation panel (step S210). The user who saw the display on the operation panel selects, from the job list, a job ID of a job desired to be executed by the image processing apparatus 110 (step 220). When the job ID selected by the user is acquired, the image processing unit 111 transmits, via the VPN, a job transmission request including the acquired job ID and the user ID of the user who selected the job ID to the image processing apparatus 230 (step S230).

In response to the job transmission request transmitted from the image processing apparatus 110, the image processing apparatus 230 extracts a print job corresponding to the job ID included in the job transmission request, and returns the print job to the image processing apparatus 110 serving as the request transmission source via the VPN (step S240).

When the image processing unit 111 acquires the print job as described above, the image processing unit 111 performs printing by executing the print job (step 250).

Thereafter, the image processing apparatus 110 may disconnect the VPN when the printing is completed (step S260). When the VPN is disconnected, if information acquired from the user or the management server 310 is stored in the image processing apparatus 110, the image processing apparatus 110 discards the information by deleting the information from the image processing apparatus 110 (step S270). By discarding the information, it is not necessary to give a user belonging to another company an opportunity to acquire the information from the image processing apparatus 110. That is, information leakage may be prevented.

According to the present exemplary embodiment, as described above, when the on-demand print service is to be provided, the image processing apparatus 110 in the shared office may be used as a child device of the image processing apparatus 230 to perform printing. Accordingly, the user may obtain a printed matter in the shared office without having to carry the user PC 130 storing the data to be printed or a printed matter of the data.

Further, as described above, the group of the image processing apparatuses providing the on-demand print service was described in a form that the group is configured such that the image processing apparatus 230 is set as the parent device and other image processing apparatuses including the image processing apparatus 110 in the shared office are set as the child devices, but the present disclosure is not limited thereto, and the group may be configured on an equal footing such that each image processing apparatus has the same function as the image processing apparatus 230, and stores apparatus information (IP address or the like) of other image processing apparatuses forming the group. In this case, the image processing apparatus 110 in the shared office participates in the group, information related to one image processing apparatus among the image processing apparatuses forming the group and corresponding to the parent device connection information is acquired from the management server 310, and an own apparatus registration request is issued via the management server 310, and thus the image processing apparatus 110 may participate in the group.

Second Exemplary Embodiment

Figure 5:
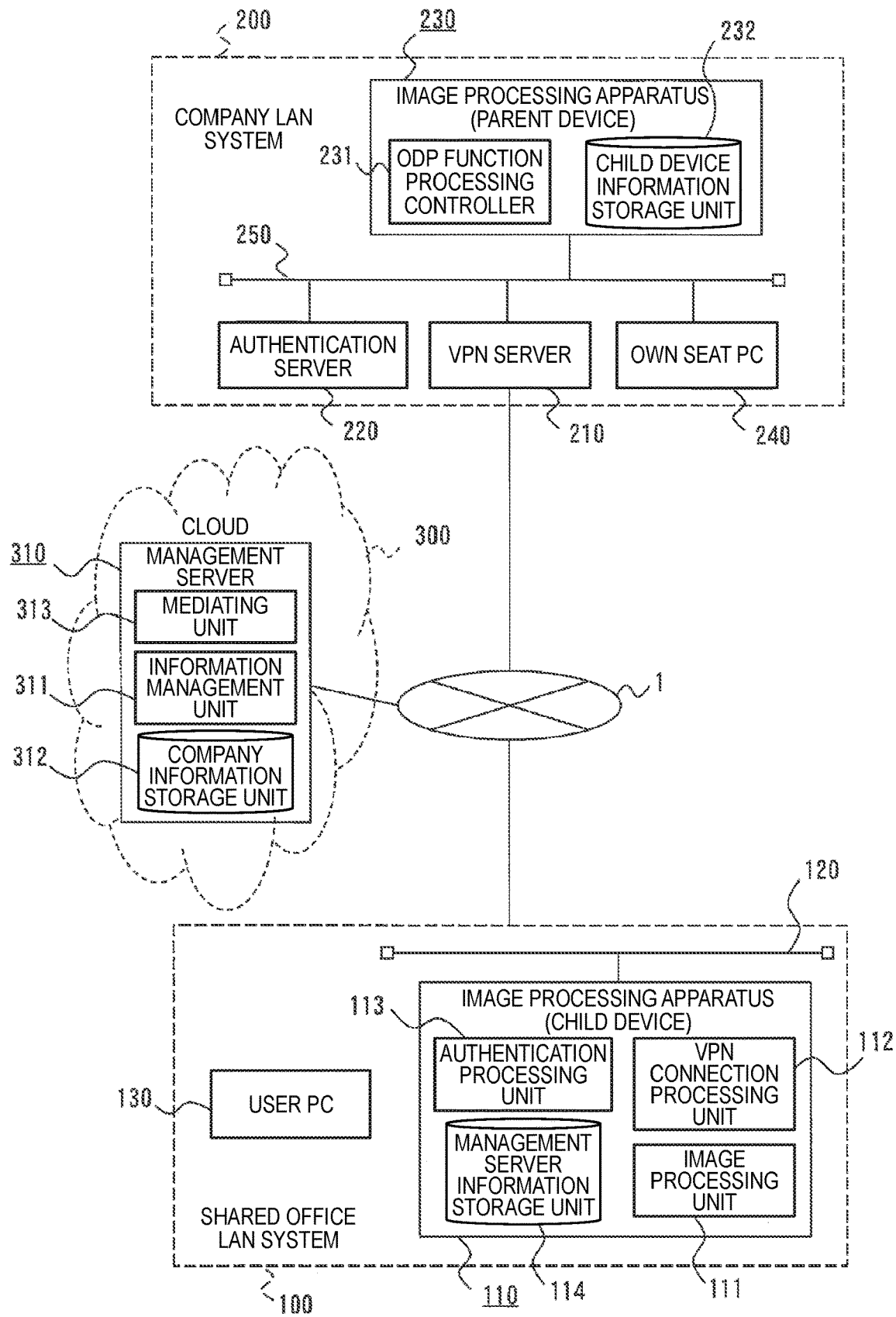
FIG. 5 is a block configuration diagram illustrating an information processing system according to a second exemplary embodiment.

FIG. 5 is a block configuration diagram illustrating an information processing system according to the present exemplary embodiment. The same components as those of the first exemplary embodiment are denoted by the same reference numerals, and description thereof will be omitted. In the present exemplary embodiment, a mediating unit 313 is provided in the management server 310 having the configuration described in the first exemplary embodiment. The mediating unit 313 has a function of mediating information exchanged between the shared office LAN system 100 and the company LAN system 200. The mediating unit 313 is implemented by a cooperative operation between a computer implementing the management server 310 and a program operating on a CPU mounted on the computer as the fourth processor.

FIG. 6 is a diagram illustrating an example of a data configuration of company information stored in the company information storage unit 312 according to the present exemplary embodiment. In the company information in the present exemplary embodiment, connected child device information is added to the data configuration shown in the first exemplary embodiment for each company. The connected child device information includes information for specifying the image processing apparatus 110 serving as a child device of the image processing apparatus 230 of the company. The information for specifying the image processing apparatus 110 is, for example, an IP address. There may be multiple image processing apparatuses 110 whose parent device is the image processing apparatus 230.

Figure 7B:
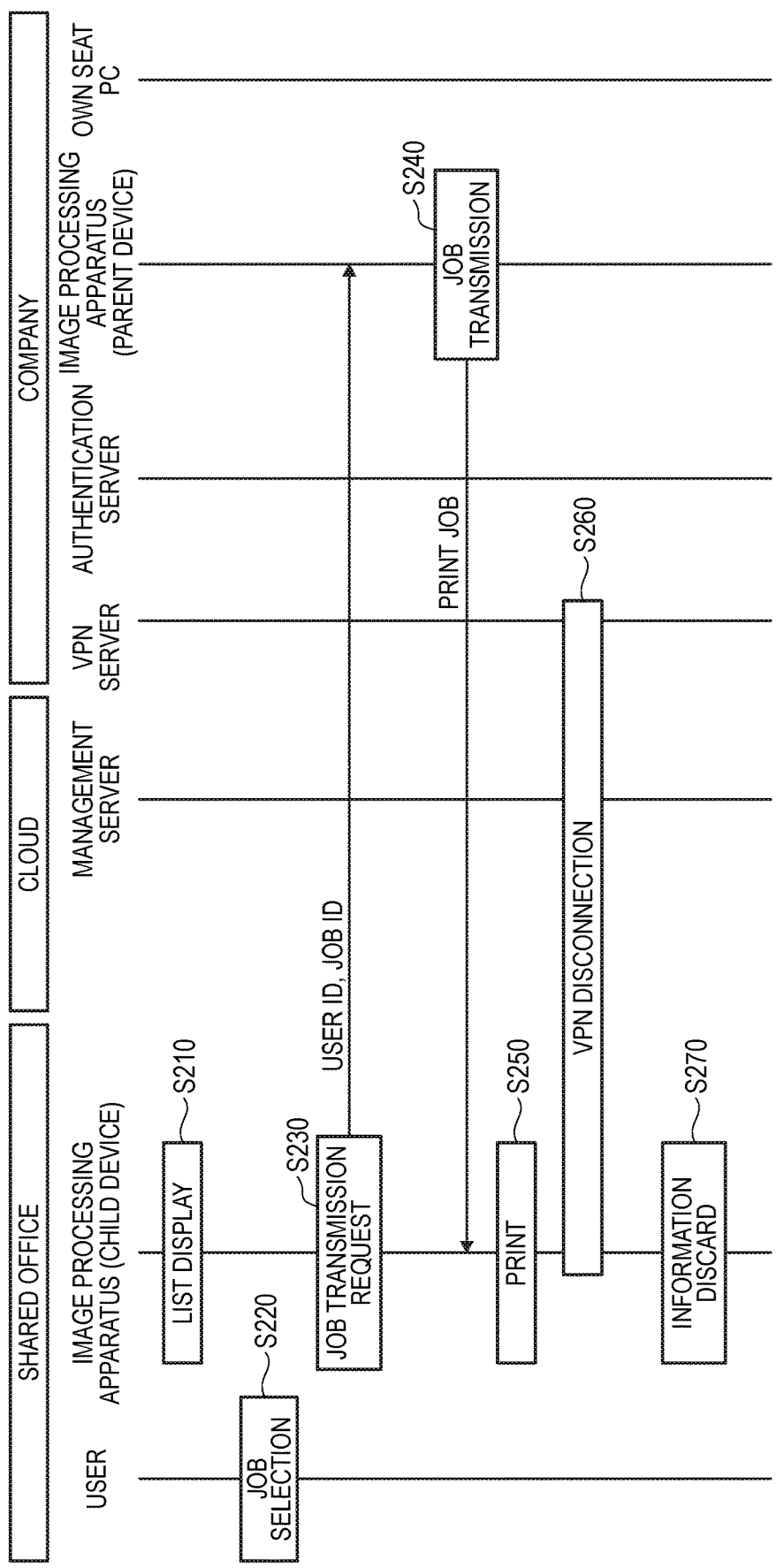
FIG. 7B is a sequence diagram following FIG. 7A.

The system configuration is different from that of the first exemplary embodiment in the point described above. Next, operations in the present exemplary embodiment will be described, but the operations may be basically the same as those in the first exemplary embodiment. However, the present exemplary embodiment is different from the first exemplary embodiment in that the mediating unit 313 of the management server 310 mediates exchange between the image processing apparatus 110 serving as the child device and the image processing apparatus 230 serving as the parent device. Hereinafter, a process in which the user of the shared office performs printing by causing the image processing apparatus 110 to execute the print job created in the company will be described with reference to sequence diagrams illustrated in FIGS. 7A and 7B. The same processing as that in the first exemplary embodiment described with reference to FIGS. 4A and 4B is denoted by the same step number, and the description thereof will be omitted as appropriate.

When the user is in the company, the user stores a print job into the image processing apparatus 230 by issuing a print instruction to the image processing apparatus 230 from the own seat PC 240 (step 110). Then, after the user goes to the shared office, the user issues a print job extraction instruction to the image processing apparatus 110, for example, by holding the IC card carried by the user over the card reader of the image processing apparatus 110 (step 120).

With this operation, the image processing apparatus 110 establishes VPN connection with the VPN server (step 130), and details of the processing will be omitted for being described in the first exemplary embodiment. Thereafter, the image processing apparatus 110 authenticates the user (step 140), and details of the processing will also be omitted for being described in the first exemplary embodiment.

Subsequently, the image processing unit 111 in the image processing apparatus 110 transmits, to the management server 310, a job list acquisition request including the apparatus ID of the own apparatus, the user ID of the user who issues the print job extraction instruction in step 120, and the company authentication information of the company to which the user belongs (step 310).

When the information management unit 311 in the management server 310 receives the job list acquisition request from the image processing apparatus 110, the information management unit 311 authenticates the company based on the company authentication information included in the request, and then registers the apparatus ID into the connected child device information of the company information (step 320). Subsequently, the mediating unit 313 transmits a job list acquisition request, via the server address and the port number included in the parent device connection information of the company from the company information, to the image processing apparatus 230, and the job list acquisition request includes the authentication information of the image processing apparatus 230 serving as the parent device, the identification information of the own apparatus (hereinafter, referred to as a "management server ID", for example, an IP address), and the user ID of the user who issues the print job extraction instruction to the image processing apparatus 110 (step 330).

The job list acquisition request also serves as the child device registration request described in the first exemplary embodiment.

When the job list acquisition request is transmitted, the ODP function processing controller 231 of the image processing apparatus 230 authenticates the management server 310 based on the authentication information included in the request, and then registers the management server 310 corresponding to the management server ID included in the job list acquisition request into the child device information storage unit 232 as a child device (step S180). Subsequently, in response to the job list acquisition request, the image processing apparatus 230 reads identification information for a print job of the user corresponding to the user ID included in the job list acquisition request among the stored print jobs, for example, the job ID, and creates a job list. Then, the image processing apparatus 230 returns the created job list to the management server 310 which is the child device of the request transmission source (step 340).

The mediating unit 313 in the management server 310 returns the job list returned from the image processing apparatus 230 to the image processing apparatus 110 serving as a job list acquisition request transmission source (step S350). A return destination may also be specified by referring to the connected child device information of the company.

Since the subsequent processing may be the same as that of the first exemplary embodiment, the description thereof will be omitted.

The image processing apparatus 110 according to the present exemplary embodiment acquires the job list via the management server 310. That is, since the management server 310 includes the mediating unit 313, the management server 310 serves as a virtual parent device for the image processing apparatus 110 serving as a child device, and serves as a virtual child device for the image processing apparatus 230 serving as a parent device in the on-demand print service.

The image processing apparatus 110 according to the present exemplary embodiment directly transmits the print job transmission request to the image processing apparatus 230 serving as the parent device as in the case of the first exemplary embodiment, but the image processing apparatus 110 may transmit the request via the management server 310 as in the case of the job list acquisition request. In this case, in terms of security, VPN connection may be established between the image processing apparatus 110 and the management server 310, and between the management server 310 and the VPN server 210 and exchange print jobs via the VPN.

However, unlike the acquisition request, the print job has a relatively large data amount. Therefore, when one management server 310 mediates print jobs exchanged between multiple shared office LAN systems 100 and company LAN systems 200, a load on the management server 310 increases. Therefore, in the present exemplary embodiment, the print job having a data amount relatively larger than information for a request or an instruction such as a job list acquisition request, was directly exchanged between the image processing apparatus 230 serving as the parent device and the image processing apparatus 110 serving as the child device in the on-demand print service so as not to impose a load on the management server 310.

The management server 310 needs to delete the IP address of the image processing apparatus 110, for which the VPN is disconnected, from the connected child device information of the company information. The VPN disconnection may be realized by, for example, receiving a notification from the image processing apparatus 110.

In the exemplary embodiments above, the term "processor" refers to hardware in a broad sense. Examples of the processor include general processors (e.g., CPU: Central Processing Unit), and dedicated processors (e.g., GPU: Graphics Processing Unit, ASIC:

Application Specific Integrated Circuit, FPGA: Field Programmable Gate Array, and programmable logic device).

In the exemplary embodiments above, the term "processor" is broad enough to encompass one processor or plural processors in collaboration which are located physically apart from each other but may work cooperatively. The order of operations of the processor is not limited to one described in the exemplary embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing system comprising:
a first processor that is mounted on a first image processing apparatus, the first image processing apparatus being placed in a shared space, and configured to be used by a plurality of users that do not belong to a same organization;
a second processor that is mounted on a connection server, the connection server being placed outside the shared space, connected to a local area network of an organization to which at least one of the plurality of users belongs, and configured to connect a virtual private line;
a third processor that is mounted on a second image processing apparatus, the second image processing apparatus being connected to the local area network of the organization; and a fourth processor that is mounted on a management server, the management server being placed outside the shared space and the local area network of the organization, and configured to manage connection server connection information used to establish the virtual private line with the connection server of the organization and access information used to access the second image processing apparatus of the organization, wherein the third processor is configured to store, in the second image processing apparatus, a job relating to image processing generated by a user belonging to the organization, the fourth processor is configured to, in response to a connection information acquisition request in which organization identification information is designated being transmitted from the first image processing apparatus, return connection server connection information corresponding to an organization designated in the connection information acquisition request, and the first processor is configured to:
in response to a job acquisition instruction including the organization identification information designated by the user, establish, via the virtual private line, connection with a connection server of an organization using the connection server connection information corresponding to the organization and acquired by automatically transmitting, to the management server, the connection information acquisition request including the organization identification information included in the job acquisition instruction, and automatically acquire a job list from the second image processing apparatus after the connection with the connection server via the virtual private line is established;
acquire, in response to a job selection instruction by the user to select a job from the job list, the job from the second image processing apparatus of the organization that is accessible using the access information of the organization via the virtual private line; and
execute the acquired job with the first image processing apparatus.

2. The image processing system according to claim 1 further comprising:
a fifth processor that is mounted on an authentication server connected to the local area network of the organization and configured to authenticate the user belonging to the organization, wherein,
in response to an access information acquisition request in which the organization identification information is designated being transmitted from the first image processing apparatus, the fourth processor is configured to return authentication server access information corresponding to an organization designated in the access information acquisition request, the authentication server access information being stored in the management server and being used for accessing the authentication server, and
the first processor is configured to:
acquire user identification information designated by the user of the first image processing apparatus;
acquire the authentication server access information corresponding to the organization by transmitting the access information acquisition request including the organization identification information included in the job acquisition instruction to the management server; and authenticate the user to the authentication server via the virtual private line using the acquired authentication server access information and the user identification information.

3. The image processing system according to claim 2 further comprising:
a sixth processor that is mounted on an information processing apparatus, the information processing apparatus being used by a user that uses the shared space, wherein
the sixth processor is configured to register a job generated by the user in the second image processing apparatus.

4. The image processing system according to claim 1, wherein
the job is a print job, and
on-demand print service is provided by transmitting the print job stored in the second image processing apparatus to the first image processing apparatus and executing the print job in the first image processing apparatus.

5. The image processing system according to claim 4, wherein
the fourth processor is configured to store, in the management server, access information of the second image processing apparatus serving as a parent device in providing of the on-demand print service, and
the first processor is configured to:
issue a registration request to the second image processing apparatus of the organization to register the first image processing apparatus as a child device of the second image processing apparatus by using access information corresponding to the organization that is acquired by transmitting, to the management server, an access information acquisition request including the organization identification information designated by the user of the first image processing apparatus; and
acquire, after being registered in response to the registration request, the job from the second image processing apparatus via the virtual private line in response to the job acquisition instruction.

6. The image processing system according to claim 5, wherein
the fourth processor is configured to:
establish, via the virtual private line, connection with the connection server using the connection server connection information;
specify the second image processing apparatus serving as the parent device by searching for a local area network to which the connected connection server is connected;
acquire access information of the specified second image processing apparatus; and
store the acquired access information in the management server.

7. The image processing system according to claim 4, wherein
the third processor is configured to register the management server in the second image processing apparatus as a child device in providing of the on-demand print service, and
the fourth processor is configured to store, in the management server, access information of the second image processing apparatus serving as a parent device in providing of the on-demand print service.

8. The image processing system according to claim 7, wherein
the fourth processor is configured to:
associate the first image processing apparatus and the second image processing apparatus by setting the second image processing apparatus corresponding to the organization designated by the user of the first image processing apparatus as the parent device and setting the first image processing apparatus as the child device of the second image processing apparatus; and
relay information exchange between the first image processing apparatus and the second image processing apparatus.

9. The image processing system according to claim 8, wherein
the first processor is configured to acquire the job from the second image processing apparatus via the management server in a case where both connection between the first image processing apparatus and the management server and connection between the management server and the connection server of the organization corresponding to the organization identification information included in the job acquisition instruction are established via a common virtual private line.

10. An image forming apparatus, that is placed in a shared space and is configured to be used by a plurality of users that do not belong to a same organization, provided in an information processing system comprising:
a connection server that is placed outside the shared space, connected to a local area network of an organization to which at least one of the plurality of users belongs, and configured to connect a virtual private line;
a first image processing apparatus that is connected to the local area network of the organization; and
a management server that is placed outside the shared space and the local area network of the organization, and configured to manage connection server connection information used to establish the virtual private line with the connection server of the organization and access information used to access a second image processing apparatus of the organization, the image forming apparatus comprising:
a processor configured to:
in response to a job acquisition instruction including organization identification information designated by the user, establish, via the virtual private line, connection with a connection server of an organization using the connection server connection information corresponding to the organization that is acquired by automatically sending, to the management server, a connection information acquisition request including the organization identification information included in the job acquisition instruction, and automatically acquire a job list from the second image processing apparatus after the connection with the connection server via the virtual private line is established;
acquire, in response to a job selection instruction by the user to select a job from the job list, the job from the first image processing apparatus of the organization that is accessible using the access information of the organization via the virtual private line; and
execute the acquired job.

11. A non-transitory computer readable medium storing a program causing to execute:

a first process, by a first computer;
a second process, by a second computer; and
a third process, by a third computer, wherein
the first process, the second process and the third processing are executed in an image processing system comprising:
- a first image processing apparatus that includes the third computer, is placed in a shared space, and is configured to be used by a plurality of users that do not belong to a same organization,
- a connection server that is placed outside the shared space, is connected to a local area network of an organization to which at least one of the plurality of users belongs, and is configured to connect a virtual private line,
- a second image processing apparatus that includes the first computer and that is connected to the local area network of the organization, and
- a management server that includes the second computer, is placed outside the shared space and the local area network of the organization, and is configured to manage connection server connection information used to establish the virtual private line with the connection server of the organization and access information used to access the second image processing apparatus of the organization, the first process includes storing a job relating to image processing that is generated by a user belonging to the organization, the second process includes returning, in response to a connection information acquisition request in which organization identification information is designated being transmitted from the first image processing apparatus, connection server connection information corresponding to an organization specified in the connection information acquisition request, and the third process includes:
- in response to a job acquisition instruction including the organization identification information designated by the user, establishing, via the virtual private line, connection with the connection server of the organization using the connection server connection information corresponding to the organization that is acquired by automatically transmitting, to the management server, the connection information acquisition request including the organization identification information included in the job acquisition instruction, and automatically acquiring a job list from the second image processing apparatus after the connection with the connection server via the virtual private line is established;
- acquiring, in response to a job selection instruction by the user to select a job from the job list, the job from the second image processing apparatus of the organization that is accessible using the access information of the organization; and
- executing the acquired job.

* * * * *